Patented July 25, 1939

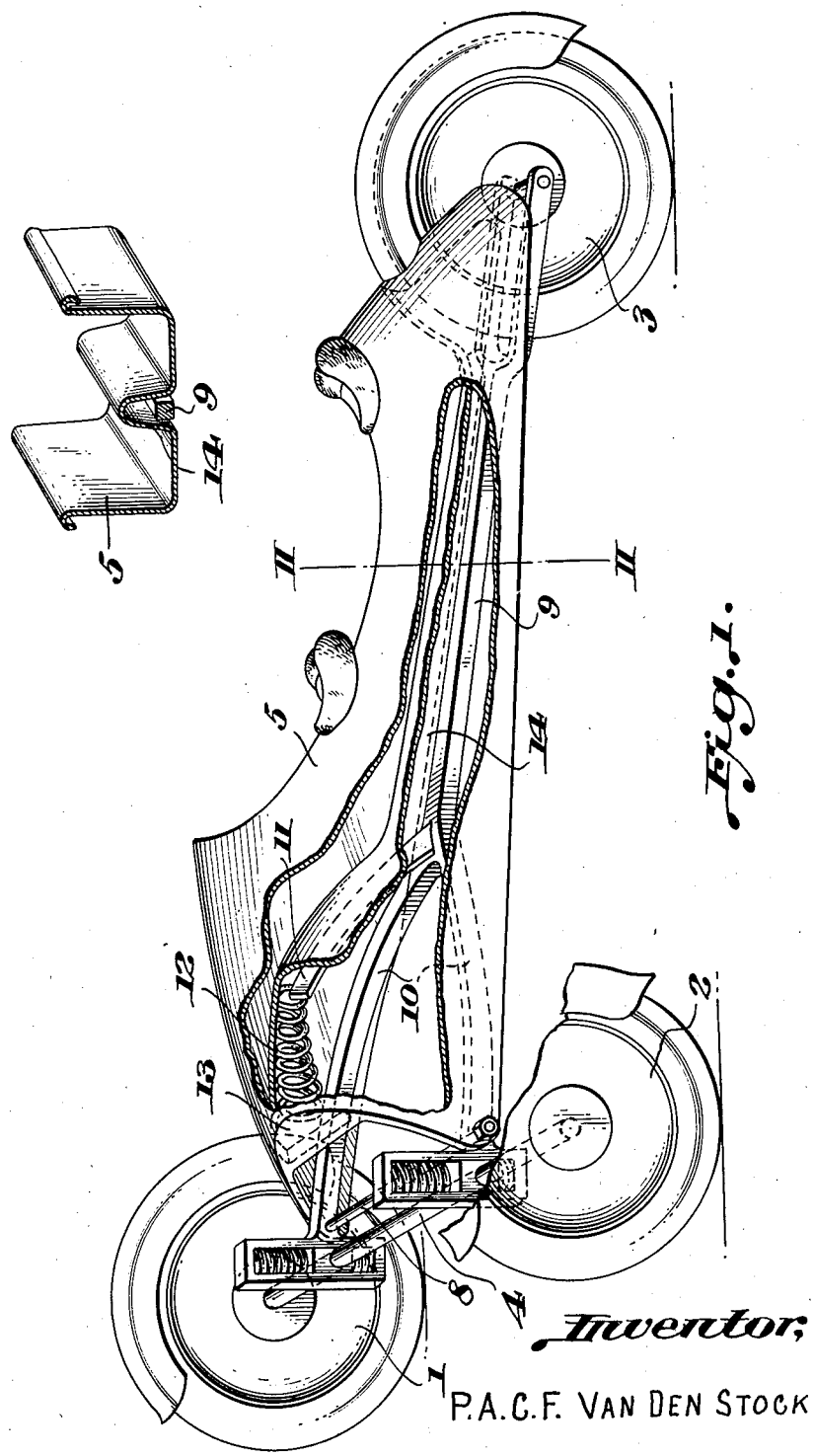

2,167,096

UNITED STATES PATENT OFFICE 2,167,096

THREE-WHEEL MOTOR CAR

Paul Anna Charles François Van den Stock,
Weluwe-Saint-Lambert, Brussels, Belgium Application November 13, 1935, Serial No. 49,635
In Belgium November 19, 1934

4 Claims. (Cl. 280—106.5)

The present invention relates to a three-wheel motor car and more particularly to a motor car of this kind having two front wheels parallelly disposed at ends of a side of an equicrural triangle and connected by a frame to the rear wheel of the car and a car body adapted to oscillate independently from said frame.

One object of the invention is to provide a motor car of the kind before-described of a very simplified construction and arrangement of parts in which said frame is allowed to oscillate independently from said car body.

For this purpose according to the invention, the car body and the frame are adapted to oscillate independently one from the other either about a common axis or adjacent parallel axes, so as to enable said frame to move normally to its axis without said car body being caused to oscillate.

Another object of the invention is to enable the frame of the car to be made of light but resistant metal members as for instance, tubular members. To this end, according to the invention, said frame is constituted by a single longitudinal member extending in the direction of the longitudinal axis of the car and having its front end forked so as to allow a hinged connection with said spindle, and an arm normally disposed to the plane of said forked portion of said connecting frame member, which arm is acted upon by one end of a spring device, the opposite end of which acts on the front part of the car body.

According to the invention, said spring device is adjustably arranged so as to allow the spring tension to be regulated in order to appropriate said spring tension to the strains caused by the load of the car or to shocks and car bumping, thus providing for an elastic suspension of the car body.

Other features of the construction and arrangement of parts will appear from the following description of the accompanying drawing which diagrammatically illustrates merely by way of example an embodiment of the invention.

Fig. 1 shows an arrangement of essential parts of the improved car.

Fig. 2 is a cross section of the car taken on the line II—II of Fig. 1.

Referring to Fig. 1 the motor car is provided with three wheels 1, 2 and 3 disposed at apexes of an equicrural triangle, the wheels 1 and 2 being the front wheels of the car.

In Fig. 1, in which the axle 4 is shown supported by the front wheels 1 and 2, the axis of rotation of the body is formed by a spindle 8 extending parallel to the front axle 4 of the car and supported by said axle 4 by means of any suitable arrangement of springs or dampers, such as generally used in motor car construction.

In order to allow the structure to be more simplified the frame part intended to connect said front wheels 1 and 2 with the rear wheel 3 consists as especially shown in Fig. 1 in a single longitudinally arranged member 9, positioned in the direction of the longitudinal axis of the car and having at its fore end a fork 10 adapted to be hinged on the axle 4, said longitudinal frame member 9 being provided with an arm 11 secured to said frame member 9 so as to project substantially normally to the plane of said fork 10, an elastic suspension of the body 5 being insured by a spring 12 interposed between said arm 11 and a rigid part 13 provided in the front part of the car body 5.

Owing to the fact that said spring 12 is adapted to simultaneously act on the arm 11 of the frame member 9 and on the front part 13 of the car body 5, any shock caused by inequalities of the road or any movement originated by the load of the car are damped, whereby the car body 5 is allowed to oscillate about the spindle 8.

Moreover, according to the invention, suitable means are provided for allowing the springs 12 to be adjusted according to the load supported by the car body 5.

According to the invention a relative movement is allowed between said longitudinal frame member 9 and the car body 5 so as to prevent the body 5 from striking against said frame part 9 when oscillating.

For this purpose a longitudinal groove 14 extending in the direction of the longitudinal axis of the car is provided in the bottom of the car body 5 above said frame member 9 (Fig. 2). Shock absorbers may also be provided at any suitable place so as to reduce the relative movement between said oscillating parts of the car.

As usual in motor car construction the motor is mounted at the front part of the car. In the improved car according to the invention, the motor is supported by the fork 10 within the groove 14, whereby an efficient cooling of the motor is effected by air circulating in said groove 14 when the car is running.

Having now particularly described and ascertained the nature of my said invention and in what manner the same is to be performed, I declare that what I claim is:

1. A three-wheel motor car comprising in combination two parallelly arranged front wheels, a front axle connecting said front wheels, a rear wheel, a rear axle carrying said rear wheel a frame connecting said front axle to said rear axle, a pivotal connection between said front axle and said frame whereby said frame is allowed to oscillate about said front axle, a car body pivotally mounted at its front end to the forward end of said frame so as to be able to oscillate normally to said front axle, an arm carried by said frame and projecting upwardly therefrom, and a spring interposed between said arm and the forward portion of said car body for suspension of said car body on said frame so that oscillations of said frame about said front axle are damped by said spring without causing said car body to oscillate.

2. A three-wheel motor car comprising in combination two parallelly arranged front wheels, a front axle connecting said front wheels, a rear wheel, a rear axle carrying said rear wheel, a single longitudinal frame member supported by said front axle and said rear axle and extending in the direction of the longitudinal axis of the car, a forked portion provided at the fore end of said longitudinal frame member, a pivotal connection between the forward end of said forked portion and said front axle whereby said frame member is allowed to oscillate about said front axle, a spindle transversely supported by the forward end of said forked portion and extending parallelly to said front axle, a car body pivotally mounted by the forward end thereof on said spindle so as to be able to oscillate about said spindle, an arm secured to said longitudinal frame member and projecting upwardly normally to the plane of said forked portion, a rigid portion provided at the front end of said car body, and a compression spring interposed between said rigid portion of said car body and the upper part of said arm.

3. A three-wheel motor car comprising in combination two parallelly arranged front wheels, a front axle connecting said front wheels, a rear axle carrying said rear wheel, a single longitudinal frame member supported by said front axle and said rear axle and extending in the direction of the longitudinal axis of the car, a forked portion provided at the forward end of said longitudinal frame member, a pivotal connection between the forward end of said forked portion and said front axle whereby said frame member is allowed to oscillate about said front axle, a spindle transversely supported by the forward end of said forked portion and extending parallelly to said front axle, a car body pivotally hinged by the forward end thereof on said spindle so as to be able to oscillate about said spindle, an arm secured to said longitudinal frame member and projecting upwards normally to the plane of said forked portion, a rigid portion provided at the front end of said car body, and a compression spring interposed between said rigid portion of said car body and the upper part of said arm, said car body having a groove longitudinally provided in the bottom thereof so as to extend above said longitudinal frame member whereby said car body and said frame member, if oscillating, are prevented from striking against each other.

4. A three-wheel motor car comprising in combination two parallelly arranged front wheels, a front axle connecting said front wheels, a rear wheel, a rear axle carrying said rear wheel, a single longitudinal frame member supported by said front axle and said rear axle and extending in the direction of the longitudinal axis of the car, a forked portion provided at the forward end of said longitudinal frame member, a pivotal connection between the forward end of said forked portion and said front axle whereby said frame member is allowed to oscillate about said front axle, a spindle transversely supported by the forward end of said forked portion and extending parallelly to said front axle, a car body pivotally hinged by the forward end thereof on said spindle so as to be able to oscillate about said spindle, an arm secured to said longitudinal frame member and projecting upwards normally to the plane of said forked portion, a rigid portion provided at the front end of said car body, and a compression spring interposed between said rigid portion of said car body and the upper part of said arm, said car body having a groove longitudinally provided in the bottom of said car body so as to extend above said longitudinal frame member and a widened portion provided at the front part of said groove above said forked portion of said frame member.

PAUL ANNA CHARLES FRANÇOIS
VAN DEN STOCK.